Patented Aug. 17, 1948

2,447,139

UNITED STATES PATENT OFFICE 2,447,139

PRODUCTION OF HALOCYCLOALKANES

Louis Schmerling, Riverside, Ill., assignor to Universal Oil Products Company, Chicago, Ill., a corporation of Delaware No Drawing. Application August 30, 1943, Serial No. 500,557

16 Claims. (Cl. 260—648)

1

This application is a continuation-in-part of my co-pending application Serial Number 465,693, filed November 16, 1942, now Patent No. 2,404,100 of July 16, 1946.

This invention relates to the production of a halonaphthenic compound by the reaction of a naphthenic hydrocarbon and an alkyl halide. More specifically, the process is concerned with the interaction of a naphthenic hydrocarbon and an alkyl halide in the presence of a novel and convenient catalyst. The halonaphthenic compounds so produced are herein referred to also by the term halocycloalkanes.

An object of this invention is the production of a monohalonaphthenic compound by reacting an alkyl halide and a naphthenic hydrocarbon in the presence of a solution formed by adding to a nitrohydrocarbon a catalyst of the Friedel-Crafts type.

Another object of this invention is the production of a monohalonaphthenic compound by reacting an alkyl halide and a naphthenic hydrocarbon in the presence of a solution formed by adding to a nitroparaffin a catalyst of the Friedel-Crafts type.

A further object of this invention is the production of a monochlorocycloalkane by reacting an alkyl chloride and a cycloparaffinic hydrocarbon in the presence of a solution formed by adding to a nitroparaffin a catalyst of the Friedel-Crafts type.

Another object of this invention is the production of a monochlorocycloalkane by reacting an alkyl chloride and a cycloparaffinic hydrocarbon in the presence of a solution formed by adding aluminum chloride to a nitroparaffin.

In one specific embodiment the present invention comprises a process for producing a monohalonaphthenic compound which comprises reacting a naphthenic hydrocarbon and an alkyl halide in the presence of a catalytic solution formed by adding a metal halide of the Friedel-Crafts type to a nitroparaffin.

In a further embodiment the present invention comprises a process for producing a monochloronaphthenic compound which comprises reacting a naphthenic hydrocarbon and an alkyl chloride in the presence of a catalytic solution formed by adding a metal halide of the Friedel-Crafts type to a nitroparaffin.

In this specification and in the claims, the term "naphthenic hydrocarbon" is intended to include the saturated monocyclic hydrocarbons, having the general formula $C_nH_{2n}$, as well as bi- and polycyclic saturated compounds. The par-

2 ticularly useful monocyclic compounds, often referred to as cycloparaffins and alkylcycloparaffins and also known as cycloalkanes and alkylcycloalkanes, are those having 5, 6, or 7 carbon atoms in the ring. The lower cycloparaffins having 3 and 4 carbon atoms or methylene groups in the ring may also be used although these hydrocarbons are not to be considered on an equivalent basis with the higher naphthenes having rings containing 5, 6, or 7 carbon atoms. Reaction of the compounds containing rings of 3 and 4 carbon atoms usually results in breaking or scission of the carbon ring. Naphthenic hydrocarbons are available in various straight run gasolines and naphtha fractions or they may be obtained as reaction products from certain hydrocarbon conversion processes, for example the catalytic cyclization of aliphatic hydrocarbons followed by hydrogenation of the resultant aromatic hydrocarbons to naphthenic hydrocarbons.

Naphthenic hydrocarbons which are of particular interest as starting materials for the present process include methylcyclopentane, methylcyclohexane, and other alkylcyclohexanes. Cyclohexane itself may also be used to produce halocyclohexanes. In general, naphthenes which contain tertiary carbon atoms are to be preferred. Bicyclic cycloparaffins such as decalin may also be utilized in producing halonaphthenic compounds.

The alkyl halides which may be used in the present process include primary chlorides and bromides containing at least 3 carbon atoms per molecule and also secondary and tertiary chlorides and bromides. In these alkyl halides the halogen has an atomic weight of from about 35 to about 80. In general, the tertiary halides are much more reactive than the primary and secondary compounds. By the term alkyl halide I mean a monohaloalkane.

The different alkyl halides which may be used in the present process are not necessarily employed under the same conditions of operation. Also, the different alkyl halides may be obtained from any sources. Thus, certain alkyl halides result from reaction of a mono-olefinic hydrocarbon and a hydrogen halide such as hydrogen chloride or hydrogen bromide preferably in the presence of a catalyst such as a metal halide of the Friedel-Crafts type, a mineral acid such as phosphoric acid or sulfuric acid, and other acid catalysts. Addition of the hydrogen halide to an olefin results in the production of a tertiary alkyl halide from a tertiary olefin such as isobutylene, trimethylethylene, etc., and of secondary alkyl halides from non-tertiary olefins containing 3 or more carbon atoms per molecule. Thus, propylene and n-butylenes produce isopropyl and secondary butyl halides, respectively. Tertiary alkyl halides may be formed also by interacting a tertiary alcohol and a hydrogen halide. Primary alkyl halides similarly utilizable in the present process are obtained by other means such as by the treatment of a primary alcohol with a hydrogen halide in the presence of a suitable catalyst such as zinc chloride, etc. Primary alkyl bromides may be obtained also by the addition of hydrogen bromide to an alpha-olefin, this addition generally being effected in the presence of peroxides or sunlight.

Catalysts suitable for use in the process of the present invention comprise solutions formed by adding a catalyst of the Friedel-Crafts type, such as aluminum chloride, aluminum bromide, ferric chloride, zirconium chloride, etc. or mixtures thereof, to a nitroparaffin such as nitromethane, nitroethane, a nitropropane, or a nitroparaffin of higher molecular weight. The different nitroparaffins which may be employed to form catalysts for the present process are not necessarily equivalent since some nitroparaffins are more suitable than others for producing catalyst solutions of high activities. The particular nitroparaffin chosen to be mixed with the Friedel-Crafts type catalyst is also dependent upon the nature and proportions of the naphthenic hydrocarbon and alkyl halide being reacted, the conditions of operation, and other factors.

The lower members of the nitroparaffin series, including nitromethane, nitroethane, and nitropropanes, dissolve relatively high proportions of Friedel-Crafts type catalysts and produce homogeneous liquids which may be contacted readily with reaction mixtures comprising naphthenic hydrocarbons and alkyl halides. Nitroaromatic hydrocarbons, such as nitrobenzene, are also utilizable in this process as solvents for catalysts of the Friedel-Crafts type. The different nitrohydrocarbons in which a catalyst of the Friedel-Crafts type may be dissolved to produce a catalyst solution may be expressed by the general formula $RNO_2$ in which R represents an alkyl group or an aryl group and $NO_2$ represents a nitro group.

By the present process, a naphthenic hydrocarbon, also called a cycloparaffin, may be reacted with an alkyl halide to produce a halocycloparaffin. During this reaction the alkyl halide is reduced to a paraffinic hydrocarbon. For example, cyclohexane and tertiary butyl chloride react to give chlorocyclohexane and isobutane. Thus it appears that a halogen transfer reaction has occurred between the naphthenic hydrocarbon and alkyl halide charged to the reaction.

The production of a halonaphthenic compound by reaction of a naphthenic hydrocarbon and an alkyl halide is carried out in the presence of a solution formed by adding a Friedel-Crafts type catalyst to a nitrohydrocarbon at a temperature of from about −40° to about +10° C. but preferably at a temperature of from about −30° to about 0° C. and under a pressure of from substantially atmospheric to approximately 100 atmospheres. At higher temperatures, secondary reactions occur which yield alkylnaphthenes. The conditions of operation are so controlled as to form the halonaphthene or halocycloparaffin as the principal product of the process. In general, a relatively high molecular proportion of naphthenic hydrocarbon to alkyl halide is employed in order to obtain a relatively high yield of halonaphthenic material. It is frequently desirable to have hydrogen present in the reaction mixture generally in a quantity of not more than about 10% of the total of the naphthenic hydrocarbon and alkyl halide charged.

The reaction of a naphthenic hydrocarbon and an alkyl halide as herein described may be carried out using either batch or continuous operation. In batch type operation the catalyst solution is charged to a reactor containing a naphthenic hydrocarbon, and the reaction mixture is then agitated while an alkyl halide or a mixture of alkyl halides is added thereto. The resulting products may be permitted to settle into two layers and may then be separated into a lower layer of catalyst and an upper layer containing excess naphthenic hydrocarbon and the produced halonaphthenic compound and paraffin. The used catalyst and unconverted naphthenic hydrocarbon, the latter being separated from the halonaphthenic compound by distillation, are returned to the autoclave for further use in a subsequent reaction treatment. Some of the nitroparaffin solvent which is slightly soluble in the reaction products may also be separated therefrom by a fractional distillation in a relatively narrow fraction boiling in the range of the nitroparaffin employed, by extraction with alkali, or by hydrolysis with a mineral acid.

The continuous type of treatment is carried out by introducing the alkyl halide or alkyl halide mixture to a circulating commingled mixture of a naphthenic hydrocarbon and the catalyst solution prepared from a catalyst of the Friedel-Crafts type and a nitroparaffin. The mixture of naphthenic hydrocarbon, alkyl halide, and catalyst solution is passed through a tortuous path in some type of baffled mixer or reactor, for example, a reactor containing a packing material, to effect intimate mixing of the catalyst solution with the organic reactants. The conditions of temperature and pressure employed in such a treatment are within the aforementioned limits, but the particular conditions employed in any particular treatment may vary with the molecular weights and reactivities of the naphthenic hydrocarbons and alkyl halides used, the concentration and activity of the catalyst solution, and other factors.

It is generally advantageous to introduce the alkyl halide at a plurality of points throughout the reaction zone rather than to commingle all of the alkyl halide with the naphthenic hydrocarbon prior to introduction to the catalytic reaction zone. In this way a relatively high ratio of naphthenic hydrocarbon to alkyl halide is maintained readily, formation of desired halonaphthenes is thereby favored, and undesired reactions are kept relatively low. The reaction mixture obtained from such a continuous treatment is then conducted to a separating zone in which the mixture of unconverted naphthenic hydrocarbon and reaction product is separated as an upper layer from the heavier catalyst layer which may be withdrawn and recycled to further use in the process. The upper layer containing unconverted naphthenic hydrocarbon and the produced halonaphthene and paraffin, thus separated from the catalyst solution, is then fractionally distilled to separate unconverted naphthenic hydrocarbon from the desired halonaphthene. The recovered unconverted naphthenic hydrocarbon may then be recycled to further treatment in the process to produce an additional quantity of halonaphthene.

The following examples are given to illustrate the process, although the data presented are not introduced with the intention of unduly restricting the generally broad scope of the invention.

*Example I*

A catalyst solution was prepared by dissolving 10 grams of anhydrous aluminum chloride in 20 grams of cooled nitromethane. This catalyst solution and 100 grams of methylcyclohexane were placed in a glass reactor provided with a motor driven stirrer and surrounded by a cooling bath. The mixture of methylcyclohexane and catalyst solution was stirred and maintained at a temperature of about 2° to 5° C. while 95 grams of tertiary butyl chloride was added dropwise thereto during a period of 2 hours. After the reaction, the product was separated from the catalyst layer weighing 27 grams. Stabilization separated the reaction product into 34 grams of isobutane and 147 grams of a higher boiling, colorless liquid. Distillation of the liquid product separated therefrom 60 grams of 1-chloro-1-methylcyclohexane boiling mainly at 151–153° C. In this run a maximum of 5 grams of hydrogen chloride was also produced.

When this run was repeated at a higher temperature of between 22° and 26° C. there was obtained 11 grams of isobutane, at least 23 grams of hydrogen chloride, and 138 grams of an upper layer of liquid products. Distillation of the latter material showed that it contained about 15 grams of 1-chloro-1-methylcyclohexane and 40 grams of higher boiling material much of which was butylmethylcyclohexane or isomers thereof.

*Example II*

Reaction of 135 grams of tertiary butyl chloride with 125 grams of methylcyclopentane in the presence of a solution formed from 10 grams of aluminum chloride and 20 grams of nitromethane was carried out in a manner similar to that described in Example I but at a reaction temperature of between about −5° and 0° C. The product obtained included 30 grams of catalyst layer, 59 grams of isobutane, about 18 grams of hydrogen chloride, and 172 grams of colorless liquid product. Distillation of the liquid product separated therefrom unconverted methylcyclopentane and tertiary butyl chloride as well as about 15 grams of 1-chloro-1-methylcyclopentane and about 50 grams of higher boiling product which apparently consisted largely of dimethyldicyclopentyl and trimethyltricyclopentyl and perhaps some butyl-methylcyclopentane. It may be that under the conditions of the reaction some of the primary products were dehydrochlorinated to methylcyclopentane which then reacted with the chloromethylcyclopentane to yield the products which were isolated.

*Example III*

Smaller amounts of by-products were obtained in a similar run in which the temperature was kept between −20° and −10° C. Thus by employing the same amounts of reactants as in Example II, there was obtained 25 grams of 1-chloro-1-methylcyclopentane and about 30 grams of higher boiling material.

*Example IV*

46 grams of tertiary butyl chloride were added slowly during 50 minutes to a glass reactor containing a well stirred mixture of 50 grams of methylcyclohexane, 10 grams of 2-nitropropane, and 5 grams of aluminum chloride maintained at a temperature of 20° to 22° C. Hydrogen chloride was evolved slowly as the tertiary butyl chloride was added; and after all of this material had been introduced, the stirring was continued for 0.5 hour. The reaction mixture was then cooled to −40° C. and the colorless upper layer was decanted from the red liquid lower layer. The colorless upper layer was washed with water and dried by freezing the water and decanting the liquid from the ice. The total reaction products consisted of 4 grams of condensible gas (mainly isobutane), 76 grams of colorless liquid product, 20 grams of catalyst layer, and 10 grams of hydrogen chloride. Fractional distillation of the dried liquid product removed therefrom unconverted tertiary butyl chloride and methylcyclohexane and separated from the reaction products 10 grams of 1-chloro-1-methylcyclohexane boiling at 153° to 156° C. and having a refractive index, $n_D^{20}$, of 1.4548. About 20 grams of products boiling higher than 1-chloro-1-methylcyclohexane were also obtained.

*Example V*

96 grams of tertiary butyl chloride were added during a period of 1.5 hours at 1° C. to a well stirred mixture of 100 grams of methylcyclohexane, 10 grams of aluminum chloride, and 20 grams of 2-nitropropane. After the tertiary butyl chloride had been introduced, the reaction mixture was stirred for 0.5 hour, then cooled to −78° C. and the yellowish upper layer of liquid product was decanted from the red liquid lower layer. The reaction products obtained consisted of 11 grams of condensable gas (mainly isobutane), 180 grams of yellowish liquid product, 17 grams of catalyst layer, and 14 grams of hydrogen chloride. Distillation of the yellowish liquid product removed unconverted tertiary butyl chloride and methylcyclohexane from a mixture of 35 grams of 1-chloro-1-methylcyclohexane and 11 grams of higher boiling products. The 1-chloro-1-methylcyclohexane had a normal boiling point of 150–154° C. and a refractive index, $n_D^{20}$, of 1.4561 to 1.4565.

*Example VI*

92 grams of tertiary butyl chloride were added during a period of 1 hour at a temperature of 2° C. to a well stirred mixture of 100 grams of methylcyclohexane, 10 grams of anhydrous ferric chloride, and 20 grams of nitromethane. After the reaction mixture was stirred for an additional hour at 2° C., it was cooled to −40° C. and the upper layer of liquid product was decanted from the lower layer consisting of dark brown catalyst solution. The decanted liquid product was then washed with water, dried, and distilled.

After removing excess methylcyclohexane, 43 grams of 1-chloro-1-methylcyclohexane were obtained having a boiling point of 151–153° C.

The character of the invention and type of results obtained by its use are evident from the preceding specification and examples although they are not to be construed to impose undue limitations on its scope.

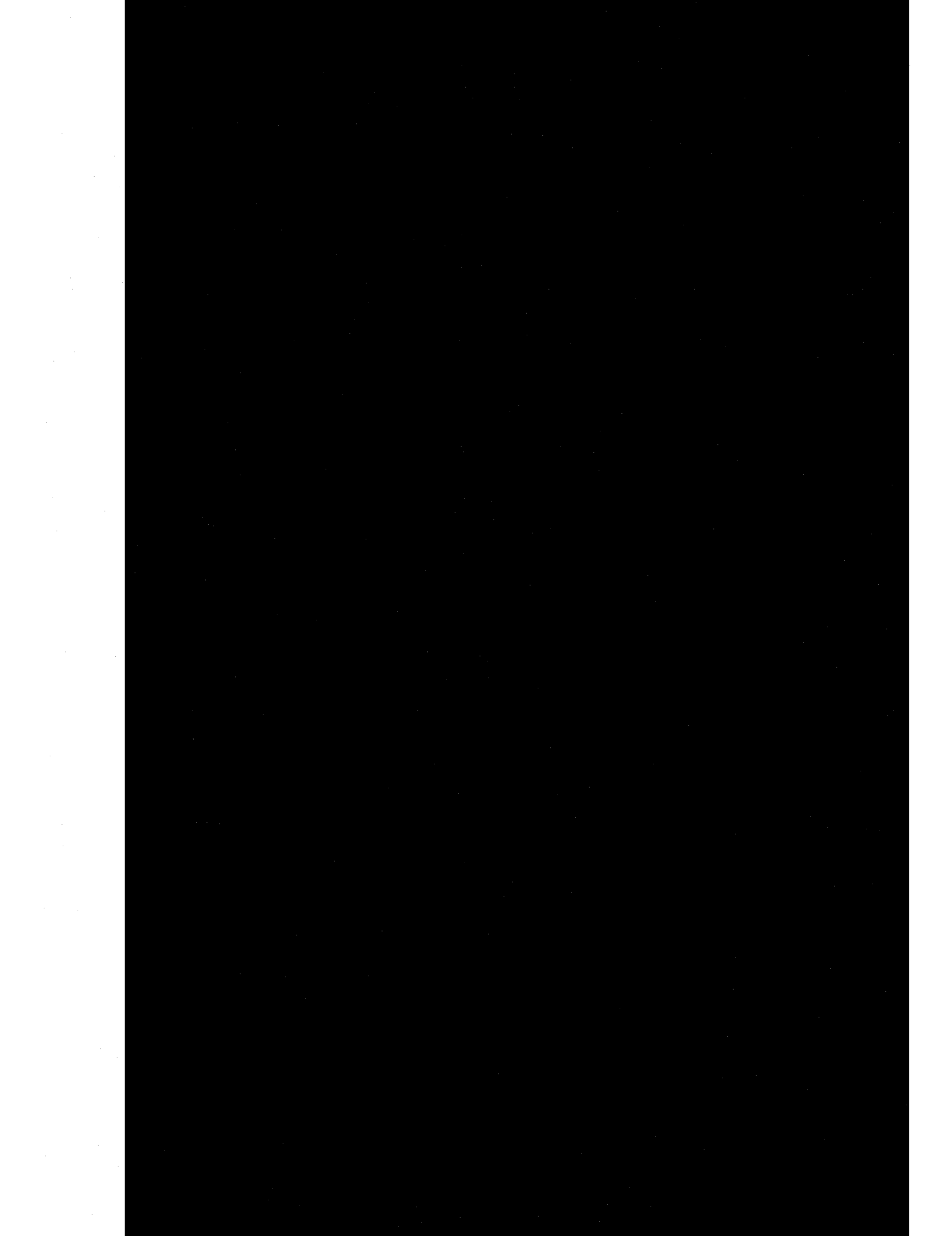

I claim as my invention:

1. A process for producing a halonaphthenic compound which comprises reacting a tertiary alkyl halide whose halogen is selected from the group consisting of chlorine and bromine with a naphthenic hydrocarbon at a temperature of from about −40° C. to about +10° C. in the presence of a catalytic solution formed by adding a Friedel-